(12) United States Patent
Sasaki (10) Patent No.: US 9,925,615 B2
(45) Date of Patent: Mar. 27, 2018

(54) ELECTRICAL BONDING METHOD (71) Applicant: ORIGIN ELECTRIC COMPANY, LIMITED, Saitama (JP)

(72) Inventor: Hiroji Sasaki, Saitama (JP)

(73) Assignee: Origin Electric Company, Limited, Saitama (JP)

( * ) Notice: Subject to any disclaimer, the term of this patent is extended or adjusted under 35 U.S.C. 154(b) by 0 days.

(21) Appl. No.: 15/513,894

(22) PCT Filed: Sep. 18, 2015

(86) PCT No.: PCT/JP2015/076780
§ 371 (c)(1),
(2) Date: Mar. 23, 2017

(87) PCT Pub. No.: WO2016/056386
PCT Pub. Date: Apr. 14, 2016

(65) Prior Publication Data
US 2017/0282282 A1 Oct. 5, 2017

(30) Foreign Application Priority Data

Oct. 10, 2014 (JP) ................................ 2014-208997

(51) Int. Cl.
*B23K 11/00* (2006.01)
*B23K 33/00* (2006.01)
(Continued)

(52) U.S. Cl.
CPC ............ *B23K 11/002* (2013.01); *B23K 11/02* (2013.01); *B23K 11/16* (2013.01); *B23K 33/00* (2013.01);
(Continued)

(58) Field of Classification Search
CPC ....... B23K 11/002; B23K 11/02; B23K 11/11; B23K 11/16; B23K 11/24; B23K 33/00;
(Continued)

(56) References Cited

U.S. PATENT DOCUMENTS

| 4,922,072 | A | 5/1990 | Topel et al. |
| 2009/0289041 | A1* | 11/2009 | Tsukamoto .......... B23K 11/002 219/91.2 |
| 2011/0104511 | A1* | 5/2011 | Okumura ............. B23K 11/093 428/594 |

FOREIGN PATENT DOCUMENTS

| JP | H06-137273 A | 5/1994 |
| JP | 2000-107867 A | 4/2000 |

(Continued)

OTHER PUBLICATIONS

International Search Report for PCT Application No. PCT/JP2015/076780, dated Dec. 8, 2015, translation, 2 pp.

*Primary Examiner* — Geoffrey S Evans
(74) *Attorney, Agent, or Firm* — Squire Patton Boggs (US) LLP (57) ABSTRACT

To bond bonding target members stacked on top of each other without generating dust or spatter into an electrically bonded article with improved mechanical strength against strong vibration etc. A first bonding target member or second bonding target member includes a relative displacement amount setting portion for setting the distance by which the bonding target portion of the first member and the bonding target portion of the second member are relatively displaced during bonding, and a current conduction suppressing layer is formed on the relative displacement amount setting portion. The second or first member includes a setting face that is placed opposed to the current conduction suppressing layer of the first or second member. In a state where the first and second members have been positioned, the distance
(Continued)

between the current conduction suppressing layer and the setting face is equal to the width H of the bonded portion.

2 Claims, 5 Drawing Sheets

(51) Int. Cl.
| | | |
|---|---|---|
| *B23K 11/16* | (2006.01) | |
| *B23K 11/02* | (2006.01) | |
| *C21D 1/40* | (2006.01) | |
| *C21D 9/50* | (2006.01) | |
| *B23K 103/04* | (2006.01) | |
| *B23K 103/06* | (2006.01) | |

(52) U.S. Cl.
CPC ............... *C21D 1/40* (2013.01); *C21D 9/50* (2013.01); *B23K 2203/04* (2013.01); *B23K 2203/06* (2013.01)

(58) Field of Classification Search
CPC ............ B23K 2203/04; B23K 2203/06; B23K 11/14; B23K 11/115; C21D 1/40; C21D 9/50
See application file for complete search history.

(56) References Cited

FOREIGN PATENT DOCUMENTS

| | | |
|---|---|---|
| JP | 2004-017048 | 1/2004 |
| JP | 3648092 | 2/2005 |
| JP | 2011-245512 | 12/2011 |

* cited by examiner

ELECTRICAL BONDING METHOD

TECHNICAL FIELD

This invention relates to an electrical bonding method or a method for manufacturing an electrically bonded article, and an electrical bonding apparatus in which a part of one bonding target member is pressed into a hole portion of the other bonding target member and their bonding target portions are electrically bonded to each other.

BACKGROUND ART

As a method for electrically bonding first and second bonding target members with high bonding strength, ring mash (trademark) bonding, for example, is known (see Patent Document 1). This electrical bonding method includes providing a first bonding target member having a bonding target portion and a second bonding target member having a hole portion with a bonding target portion having an inside diameter which is slightly smaller than the outside diameter of the bonding target portion of the first bonding target member, positioning and placing the first bonding target member on the second bonding target member such that the bonding target portion of the first bonding target member slightly overlaps the bonding target portion of the hole portion of the second bonding target member, and applying a current, in this state, to the first and second bonding target members under pressure until their bonding target portions undergo plastic flow and pressing the bonding target portion of the first bonding target member into the bonding target portion of the hole portion of the second bonding target member to electrically bond the first and second bonding target members.

A feature of this ring mash bonding is that because the bonding target portion of the first bonding target member and the bonding target portion of the second bonding target member increase their bonding areas while undergoing plastic flow by the effect of the pressing force and bonding current and a vicinity of an outer peripheral surface of the bonding target portion of the first bonding target member and a vicinity of an inner peripheral surface of the bonding target portion of the second bonding target member are eventually solid-phase bonded to each other with a certain bonding width, high bonding strength can be achieved without being significantly affected by the dirt on the surfaces or the roughness of the surfaces of the bonding target portions.

When the bonding target members are made of a ferrous material containing carbon, such as carbon steel containing carbon above a certain level, steel having a carburized surface or cast iron, undesired quenching occurs during electrical bonding. Thus, even when high bonding strength is achieved by a ring mash bonding method, a bonded part including and in the vicinity of the bonded portion suffer the problem of becoming harder and more brittle, and, consequently, having lower mechanical strength. Therefore, when the bonding target members are made of a ferrous material containing carbon, such as carbon steel containing carbon above a certain level, steel having a carburized surface or cast iron, the bonded part needs to be tempered by applying a heating current to it after electrical bonding (see Patent Document 2).

RELATED ART DOCUMENT

Patent Document

Patent Document 1 Japanese Patent Application Publication No. 2004-17048
Patent Document 2 Japanese Patent No. 3648092

DISCLOSURE OF INVENTION

Problem to be Solved by the Invention

When a bonded article electrically bonded by such a ring mash bonding method is used in a machine or apparatus in which it is exposed to significant vibrations or external forces from different directions during operation, there is a desire to maintain the service life of the bonded article for a longer period even when the bonded portion of the bonded article is exposed to significant vibrations or impact forces from different directions.

In an actual production line, the distance (dimension) by which the bonding target portion of the first bonding target member is pressed into the bonding target portion of the hole portion of the second bonding target member during bonding may vary because of some (random) variation in shapes or dimensions of the first and second bonding target members or some variation in the pressing force or bonding current in the electrical bonding apparatus. There is a desire to achieve stable bonding strength even when the area of the bonded portion or the like may vary as described above.

In one implement of the present invention, a relative displacement amount setting portion for setting the distance by which the bonding target portion of the first bonding target member and the bonding target portion of the second bonding target member are relatively displaced is formed on either one or both of the first and second bonding target members in order to solve the above problem. Thus, when a post-heating current is applied to the bonding target members after electrical bonding to temper the bonded part, a portion of the post-heating current flows through the contact (abutting) point between the first or second bonding target member and the relative displacement amount setting portion if the first or second bonding target member is in direct contact with the relative displacement amount setting portion. This may not only lead to inability to achieve the desired effect from tempering but also cause variation in the effect of tempering.

In addition, the post-heating current must be increased by the amount of current that flows through the contact point between the first or second bonding target member and the relative displacement amount setting portion. Because a post-heating current comparable to or exceeding the bonding current must be applied for desirable tempering as described in Patent Document 2 listed above, a post-heating current much higher than the bonding current must be applied if the post-heating current must be increased by the amount of current that flows through the contact point between the first or second bonding target member and the relative displacement amount setting portion. Thus, the output capacity of the power source for electrical bonding or wasteful power loss increases. This not only is economically disadvantageous but also may lead to an undesirable phenomenon such as high heat generation at the contact point between the first or second bonding target member and the relative displacement amount setting portion.

Means for Solving the Problem

Figure 1A:
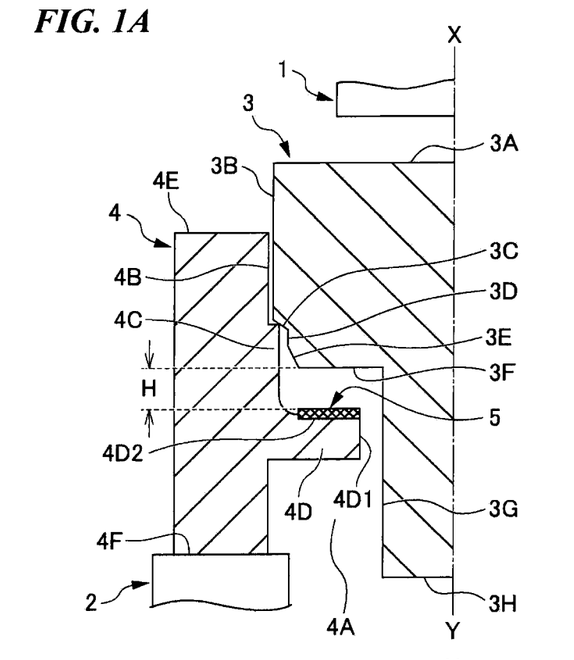
FIG. 1A is a cross-sectional view for explaining an electrical bonding method according to a first embodiment of the present invention, which shows the state before bonding.
Figure 1B:
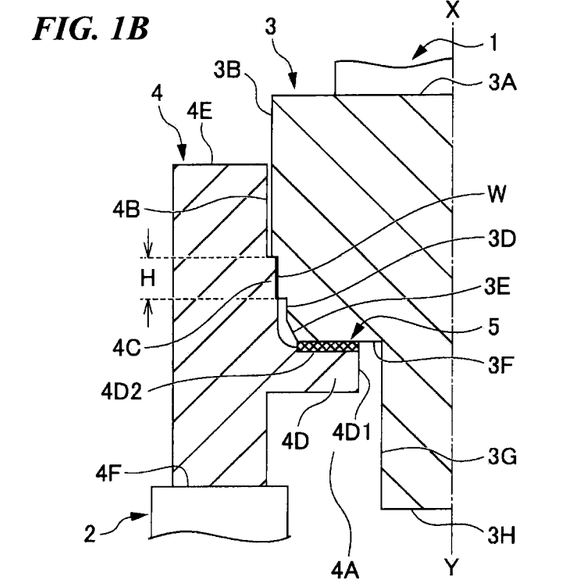
FIG. 1B is a cross-sectional view for explaining an electrical bonding method according to a first embodiment of the present invention, which shows the state after bonding.
Figure 4:
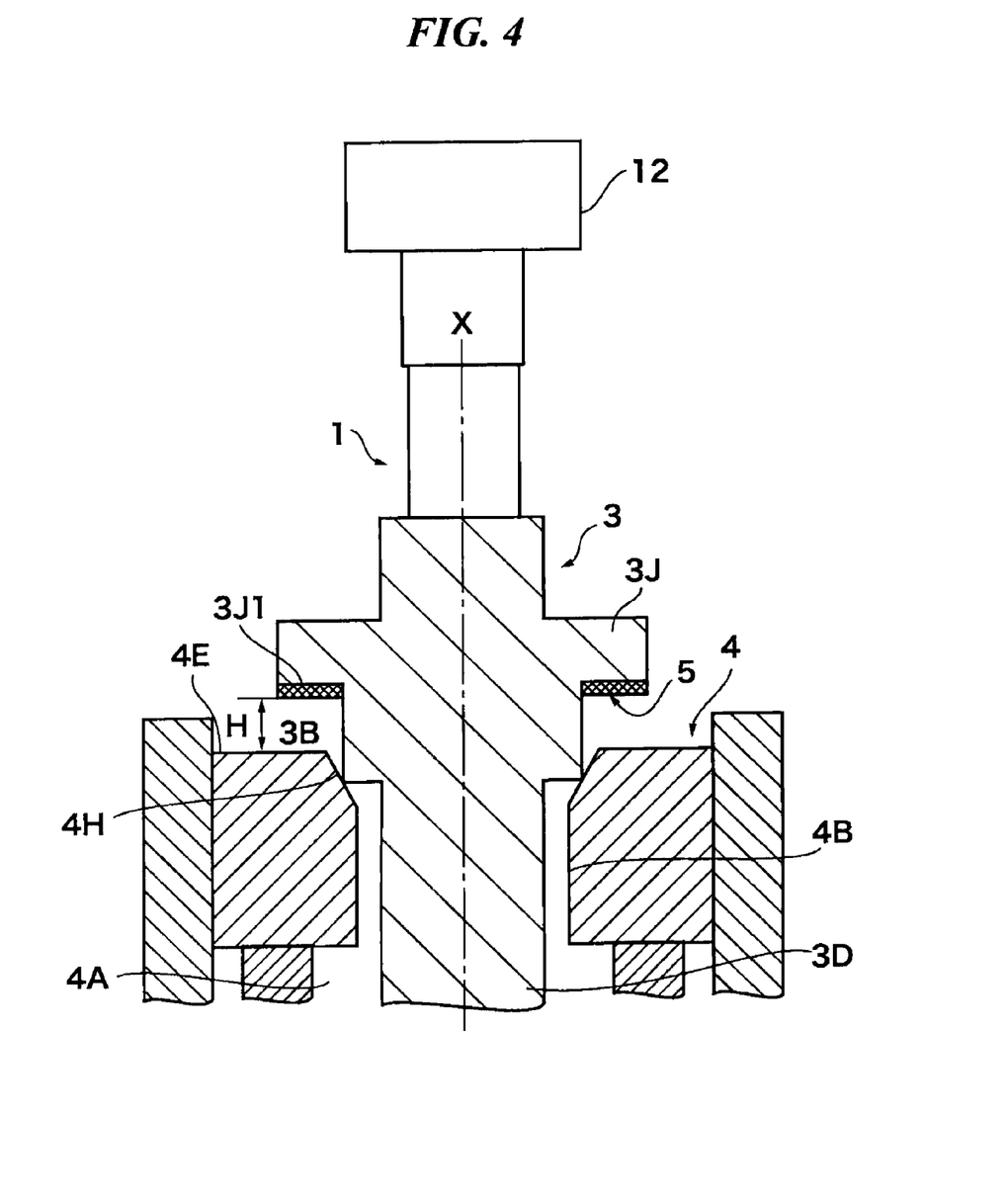
FIG. 4 is a view that shows a configuration in a case where a pressure device is provided separated from an electrode.
Figure 5:
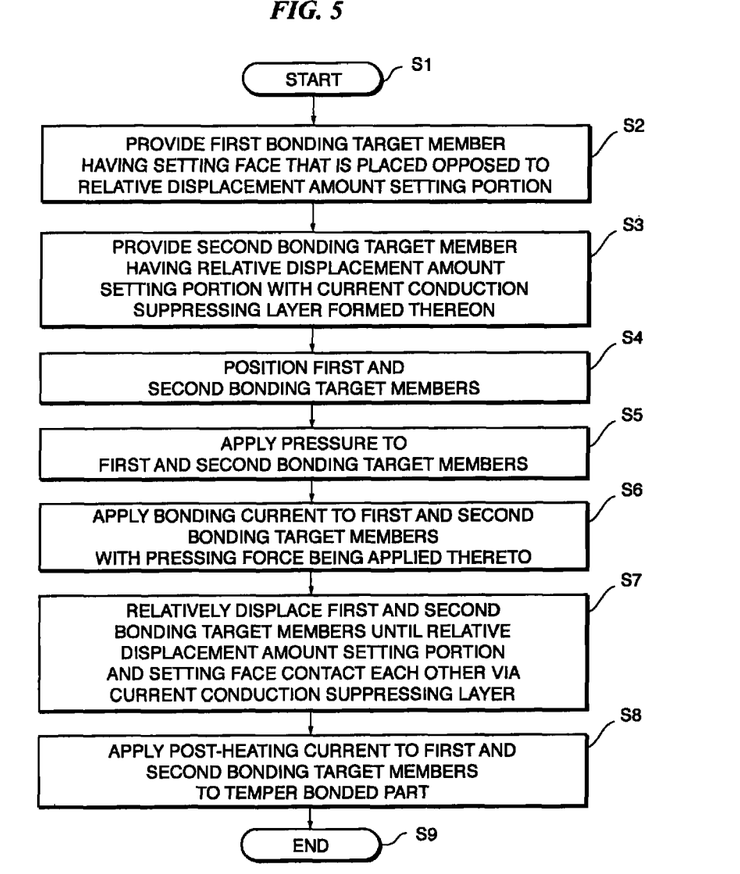
FIG. 5 is a flowchart explaining a method according to the embodiment of the present invention for manufacturing a bonded article.

A method of the first aspect for manufacturing a bonded article, as shown in FIG. 1A, FIG. 1B and FIG. 5 for example, comprises the steps of: providing a first bonding target member 3 (S2); providing a second bonding target member 4 (S3) to be bonded to the first bonding target member 3, the second bonding target member 4 having a hole 4A portion for receiving a part of the first bonding target member 3, the first 3 or second bonding target member 4 having a relative displacement amount setting portion 4D for setting the distance by which a bonding target portion of the first bonding target member 3 and a bonding target portion of the second bonding target member 4 are relatively displaced during bonding, the second 4 or first bonding target member 3 having a setting face 3F that is placed opposed to the relative displacement amount setting portion 4D, either one or both of the relative displacement amount setting portion 4D of the first 3 or second bonding target member 4 and the setting face 3F of the second 4 or first bonding target member 3 having a current conduction suppressing layer 5 formed thereon for suppressing conduction of current so that the relative displacement amount setting portion 4D can contact the setting face 3F of the first 3 or second bonding target member 4 via the current conduction suppressing layer 5 during bonding; applying a pressing force (S5) to the first and second bonding target members 3, 4; relatively displacing (S7) the first and second bonding target members 3, 4 until the relative displacement amount setting portion 4D and the setting face 3F contact each other via the current conduction suppressing layer 5 during bonding (S6) when a bonding current to the first and second bonding target members 3, 4 with the pressing force being applied thereto to form a bonded portion; and applying a post-heating current (S8), after the displacing step, to the first and second bonding target members 3, 4 whereby the post-heating current flows substantially only through a bonded portion formed between the first and second bonding target members 3, 4 to temper a bonded part of the bonded portion. Typically, a bonded part including and in the vicinity of the bonded portion is tempered. An electrical bonding apparatus of the second aspect, comprises: a first positioning member 7 for positioning a first bonding target member 3 with a cylindrical shape in a direction perpendicular to a central axis X-Y thereof; a second positioning member 8 for positioning a second bonding target member 4 having a hole portion 4A with a circular shape for receiving the first bonding target member 3 to align a central axis X-Y of the hole portion 4A of the second bonding target member 4 with the central axis X-Y of the first bonding target member 3; a bonding target member displacing device 7, 8 for relatively displacing the first and second bonding target members 3, 4 in a direction of the aligned central axes X-Y; a pressure device 12 for applying a pressing force to the first and second bonding target members 3, 4 for example as shown in FIG. 4; and first and second electrodes 1, 2 that are brought into contact with the first and second bonding target members 3, 4, respectively, to apply a current between the first and second bonding target members 3, 4; wherein the first positioning member 7 and the second positioning member 8 are configured to expand or contract in a direction across the central axes X-Y to fix the bonding target members 3, 4 in order to position the bonding target members 3, 4.

Here, the pressure device 12 may also have the function of a bonding target member displacing device for displacing the bonding target members while applying a pressing force thereto. The method of the third aspect for manufacturing a bonded article is a method according to the first aspect, wherein, as shown in FIG. 1A, FIG. 1B, FIG. 3 and FIG. 5 for example, the width of the bonded portion formed between the first and second bonding target members 3, 4 in the direction in which the first and second bonding target members are relatively displaced is determined by the position of the relative displacement amount setting portion 4D, 3J the first 3 or second bonding target member 4 and the position of the setting face 3F, 4E of the second 4 or first bonding target member 3 before the start of bonding and the thickness of the current conduction suppressing layer 5, 5A, 5B.

Effect of the Invention

According to the present invention, it is possible to provide an electrically bonded article that has improved mechanical strength against significant vibrations or impact forces.

BEST MODE FOR CARRYING OUT THE INVENTION

This application is based on the Patent Application No. 2014-208997 filed on Oct. 10, 2014 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

According to one implement of the present invention, one of the first and second bonding target members includes a relative displacement amount setting portion for setting the distance by which the bonding target portion of the first bonding target member and the bonding target portion of the second bonding target member are relatively displaced during bonding, and the other of them includes a setting face that is placed opposed to the relative displacement amount setting portion. In addition, in order to prevent a portion of the post-heating current from flowing through the relative displacement amount setting portion and the setting face when a post-heating current is applied to the bonding target members after electrical bonding to temper the bonded part, a current conduction suppressing layer is provided on either one or both of the relative displacement amount setting portion and the setting face, which is brought into contact with the relative displacement amount setting portion, so that the relative displacement amount setting portion can contact the setting face via the current conduction suppressing layer during bonding.

Further, embodiments are described herein below.

First Embodiment

One example of a basic embodiment of an electrical bonding method according to the present invention, what is called a ring mash bonding method, is first described with reference to FIG. 1A, FIG. 1B. FIG. 1A shows a state in which no pressing force has been applied to a first bonding target member 3 and a second bonding target member 4 by a first bonding electrode 1 and a second bonding electrode 2, in other words, a state before bonding in which the first bonding target member 3 has been positioned and placed on the second bonding target member 4. FIG. 1B shows a state in which the first bonding target member 3 and the second bonding target member 4 have been electrically bonded to each other. It should be noted that the central axis X-Y used in the description of embodiments of the present invention refers to a straight line extending in the direction in which the first bonding target member 3 and the second bonding target member 4 are pressed against each other, in other words, passing through the center of the first bonding target member 3 in the direction in which the first bonding target member 3 and the second bonding target member 4 are relatively displaced during bonding.

While a case where the electrodes serve also as a pressure device is herein described, a pressure device may be provided separately from the electrodes as shown in FIG. 4, in which case it should be ensured that the electrodes closely contacts the bonding target members. The bonding target member may be clamped by an electrode at, for example, a face 3B. Alternatively, the electrode may be formed in a sheet-like shape or as a thin plate and interposed between a pressure portion of the pressure device and a bonding target member so that the electrode and the target member to be contacted thereto can closely contact each other.

The first bonding target member 3 is made of a ferrous material containing carbon, for example. The first bonding target member 3 is circular in a cross-section perpendicular to its central axis X-Y, for example, and its external surface consists of a face 3A with which the first bonding electrode 1 will be brought into contact, a face 3B of a part with a large diameter extending in the same direction as the central axis X-Y, an inclined face 3C inclined toward the central axis X-Y from the face 3B, a face 3D of a part with an outside diameter that is slightly smaller than that of the part corresponding to the face 3B, an inclined face 3E inclined toward the central axis X-Y from the face 3D, a setting face 3F extending perpendicular to the central axis X-Y from the inclined face 3E, a face 3G of a small-diameter portion extending in the same direction as the central axis X-Y, and a free end face 3H that will not contact anything. The setting face 3F is described later. Because the inclined face 3E is to form a space for receiving the metal materials that have been melted or undergone plastic flow during bonding, it is unnecessary when there is provided a space for receiving the metal materials that have undergone plastic flow elsewhere.

The second bonding target member 4 is a cast iron casting containing carbon, for example. The second bonding target member 4 has a hole portion 4A, which is a through hole here. The hole portion 4A includes an inner face 4B having an inside diameter that is slightly larger than the outside diameter of the face 3B of the part with a large diameter of the first bonding target member 3, a part 4C that protrudes slightly toward the central axis X-Y from the inner face 4B and at least partially serves as a bonding target portion, and an annular relative displacement amount setting portion 4D extending perpendicular to the central axis X-Y and protruding toward the central axis X-Y beyond the part 4C. The annular relative displacement amount setting portion 4D has an inner face 4D1 extending almost parallel to the central axis X-Y. The inner face 4D1 of the relative displacement amount setting portion 4D has an inside diameter that is greater than the outside diameter of the face 3G of the small-diameter portion of the first bonding target member 3 and the relative displacement amount setting portion 4D therefore does not contact the first bonding target member 3. The reference numeral 4E designates a face on the entrance side of the hole portion 4A of the second bonding target member 4, in other words, the face on the side from which the first bonding target member is inserted, and the reference numeral 4F designates an end face located on the opposite side from the face 4E.

Even when a bonded article manufactured by electrically bonding the first bonding target member 3 and the second bonding target member 4 is used in a machine or apparatus that generates large mechanical stress, such as vibrations in different directions, mechanical stress caused by vibrations or impact forces are shared by both the bonded portion between the first bonding target member 3 and the second bonding target member 4 and the setting face 3F and the relative displacement amount setting portion 4D and the mechanical stress on the bonded portion decreases if the vibrations in different directions or the like are also exerted between the setting face 3F and the relative displacement amount setting portion 4D. This improves the reliability of the bonded article manufactured by electrically bonding the first bonding target member 3 and the second bonding target member 4. Here, the relative displacement amount setting portion 4D is preferably formed integrally with the rest of the second bonding target member 4 from the standpoint of mechanical strength. In addition, the degree of parallelization between the opposite faces of the setting face 3F of the first bonding target member 3 and the relative displacement amount setting portion 4D of the second bonding target member 4 is preferably high. In this case, an external force is applied evenly to the entire region between the setting face 3F and the relative displacement amount setting portion 4D. This helps to further improve the mechanical strength.

In addition, as described above, in an actual production line, the distance (dimension) by which the bonding target portion of the first bonding target member is pressed into the bonding target portion of the hole portion of the second bonding target member during bonding may vary because of some variation in shapes or dimensions of the first and second bonding target members or some variation in the pressing force or bonding current in the electrical bonding apparatus. Because the distance between the relative displacement amount setting portion 4D and the setting face 3F of the first bonding target member 3 regulates the relative displacement amount between the first and second bonding target members during bonding to be uniform or constant to make the bonding width of the bonded portion uniform or constant, the relative displacement amount setting portion 4D and the setting face 3F also play an important role of reducing the variation in bonding strength to a very low level and making the bonding strength of the bonded articles almost uniform.

A current conduction suppressing layer 5 is formed on a face 4D2 of the relative displacement amount setting portion 4D that abuts on the setting face 3F of the first bonding target member 3 during bonding. The current conduction suppressing layer 5 is provided to suppress current conduction so that the post-heating current does not substantially flow between the setting face 3F of the first bonding target member 3 and the relative displacement amount setting portion 4D of the second bonding target member 4 during tempering that is carried out after the first bonding target member 3 and the second bonding target member 4 are bonded to each other. Here, the expression "not substantially flow" means that the current value flowing through the current conduction suppressing layer is relatively so small compared to the post-heating current flowing through the bonded portion as to be negligible. Typically, the current value flowing through the current conduction suppressing layer, which needs to be smaller than the post-heating current flowing through the bonded portions, is preferably at most ⅓, more preferably at most 1/10, still more preferably at most 1/50, the post-heating current flowing through the bonded portions. In some cases, the term "suppress" means not only to keep the current value low but also to prevent (insulate) current conduction.

Thus, the current conduction suppressing layer 5 can be an electrically insulating film or sheet or a high-resistance thin plate that has such a material strength or thickness that its electrical insulation property or current conduction suppressing ability is not affected by the pressing force during the electrical bonding. In general, because the resistance of the bonded portion between the first bonding target member 3 and the second bonding target member 4 after electrical bonding is so low as to be negligible, the current conduction suppressing layer 5 may be made of a resistive material having a resistance that is sufficiently higher than the very low resistance of the bonded portion (herein, this is the meaning of the term "high-resistance") when the area of the bonded portion is large enough to allow passage of the peak value of the post-heating current for tempering.

As examples of the current conduction suppressing layer 5, various things can be contemplated including an ALUMITE (trademark) (anodized aluminum) treated aluminum thin plate, a metal oxidation film formed by oxidation treatment of the face 4D2 of the relative displacement amount setting portion 4D, a ceramic thin plate, an electrically insulating coating film, a thin film or thin plate made of an electrically insulating resin or the like and having excellent mechanical strength. When a bonded article manufactured by bonding the first bonding target member 3 and the second bonding target member 4 is used in a machine that generates large mechanical stress such as vibration, an electrically insulating material or resistive material having low elasticity is preferred and the use of an electrically insulating substance having high elasticity, such as rubber, as the current conduction suppressing layer 5 is not preferable.

While the thickness of the current conduction suppressing layer 5 is not limited, there are cases where a thin current conduction suppressing layer 5 is preferable from the standpoint of the cost or the determination of an initial distance (dimension) between the face 4D2 of the relative displacement amount setting portion 4D and the setting face 3F of the first bonding target member 3 when the current conduction suppressing layer 5 is, for example, a metal oxidation film formed by oxidation treatment of the face 4D2 of the relative displacement amount setting portion 4D although it depends on the surface roughness of the face 4D2 of the relative displacement amount setting portion 4D and the setting face 3F of the first bonding target member 3.

When bonding is carried out, the first bonding target member 3 is first positioned and placed on the second bonding target member 4 such that the face 3B of the first bonding target member 3 does not contact the inner face 4B of the hole portion 4A of the second bonding target member 4 and the inclined face 3C of the first bonding target member 3 contacts a corner portion of the part 4C of the second bonding target member 4 as shown in FIG. 1A. At this time, the distance between the setting face 3F of the first bonding target member 3 and the current conduction suppressing layer 5 is "H." The distance H, which is equal to the displacement amount by which the first bonding target member 3 and the second bonding target member 4 are relatively displaced during bonding, is an important element that determines the bonding width, in the direction of the central axis X-Y, of a bonded portion W shown in FIG. 1B. The relative displacement amount setting portion 4D is formed in such a position that this condition is fulfilled, in other words, in a position in the hole portion 4A of the second bonding target member 4 and the thickness of the current conduction suppressing layer 5 is determined, and the position of the setting face 3F of the first bonding target member 3 is determined accordingly. Here, the corner portion of the part 4C is shown as a part with a right-angled cross-section in the drawing, but the right-angled corner may be cut away along the entire circumference of the part 4C to form an inclined face (chamfered face) or curved face (C-face). In this case, the inclined face 3C of the first bonding target member 3 is positioned and placed on the inclined face or curved face of the part 4C of the second bonding target member 4.

Next, the first bonding electrode 1 is moved along the central axis X-Y toward the second bonding electrode 2 until it comes into soft contact with the face 3A of the first bonding target member 3. At this time, the second bonding electrode 2 is in contact with the face 4F of the second bonding target member 4 to support the second bonding target member 4. Further, the first bonding electrode 1 is moved along the central axis X-Y to apply a pressing force that increases along a predetermined curve to the first bonding target member 3. During the process of increasing the pressing force, an electrical current is applied between the first bonding electrode 1 and the second bonding electrode 2 to apply a bonding current between the first bonding target member 3 and the second bonding target member 4.

At this time, because the inclined face 3C of the first bonding target member 3 is only in contact with the corner portion of the part 4C of the second bonding target member 4 in the initial stage, the corner portion of the part 4C functions as a projection. Thus, because the bonding current flows intensively through the contact point, the temperature of the vicinity of the point where the inclined face 3C of the first bonding target member 3 is in contact with the corner portion of the part 4C of the second bonding target member 4 increases rapidly and their parts in contact with or abutting on each other undergo plastic flow.

With the progress of this plastic flow, a part of a bonding target portion shown as the face 3B of the first bonding target member 3 is pressed into the part 4C of the second bonding target member 4 by the pressing force and solid phase bonding proceeds along the direction of the central axis X-Y. Along with this, the heat generated at the bonded part between the bonding target members is transferred in the direction of the central axis X-Y, and the plastic flow of the bonded part proceeds along the direction of the central axis X-Y in the same manner. Then, when the setting face 3F of the first bonding target member 3 contacts or abuts the current conduction suppressing layer 5, the first bonding electrode 1 is stopped. A bonded portion W having a bonding width H that is equal to the distance H by which the first bonding target member 3 has been moved, i.e., displaced, in the direction of the central axis X-Y is formed between the first bonding target member 3 and the second bonding target member 4. Thus, because the depth by which a bonding target portion shown as the face 3B of the first bonding target member 3 is pressed into a bonding target portion shown as the part 4C of the second bonding target member 4 during bonding, in other words, the relative displacement amount between the first bonding target member 3 and the second bonding target member 4, is equal to the distance H between the setting face 3F of the first bonding target member 3 and the current conduction suppressing layer 5 formed on the relative displacement amount setting portion 4D regardless of variation due to processing accuracy during manufacture of the first bonding target member 3 and the second bonding target member 4 or variation in the pressing force, the width of the bonded portion W is equal to the distance H. Thus, bonded articles with uniform or constant bonding strength can be obtained.

After the bonding step is carried out as described above, a tempering step is carried out. While the pressing force applied during the bonding step is continuously maintained at nearly a constant level, the pressing force may be once reduced to almost zero for solidification of the bonded portion W and then increased again along a predetermined curve when a post-heating current for tempering is applied. The post-heating current is applied after the bonded portion W between the first bonding target member 3 and the second bonding target member 4 is solidified. In the state shown in FIG. 1B, a post-heating current is applied to the first bonding target member 3 and the second bonding target member 4 through the first bonding electrode 1 and the second bonding electrode 2. Because the setting face 3F of the first bonding target member 3 and the relative displacement amount setting portion 4D of the second bonding target member 4 are in contact with each other via the current conduction suppressing layer 5 after bonding, the post-heating current does not substantially flow between the setting face 3F of the first bonding target member 3 and the relative displacement amount setting portion 4D of the second bonding target member 4 and almost all post-heating current flows between the first bonding target member 3 and the second bonding target member 4 through the bonded portion W.

Thus, even when the relative displacement amount setting portion 4D is provided, there is no need to apply a high post-heating current compared to the conventional cases and no unnecessary heat is generated between the setting face 3F of the first bonding target member 3 and the relative displacement amount setting portion 4D of the second bonding target member 4. In addition, because the first bonding target member 3 and the second bonding target member 4 receive mechanical stress caused by vibrations or impact forces from the outside not only at the bonded portion W but also at the contact area between the setting face 3F of the first bonding target member 3 and the relative displacement amount setting portion 4D of the second bonding target member 4, the mechanical strength is improved compared to the case where the relative displacement amount setting portion 4D and the setting face 3F are not provided. Needless to say, when necessary, the current conduction suppressing layer 5 may be provided on the setting face 3F of the first bonding target member 3.

Second Embodiment

Figure 2:
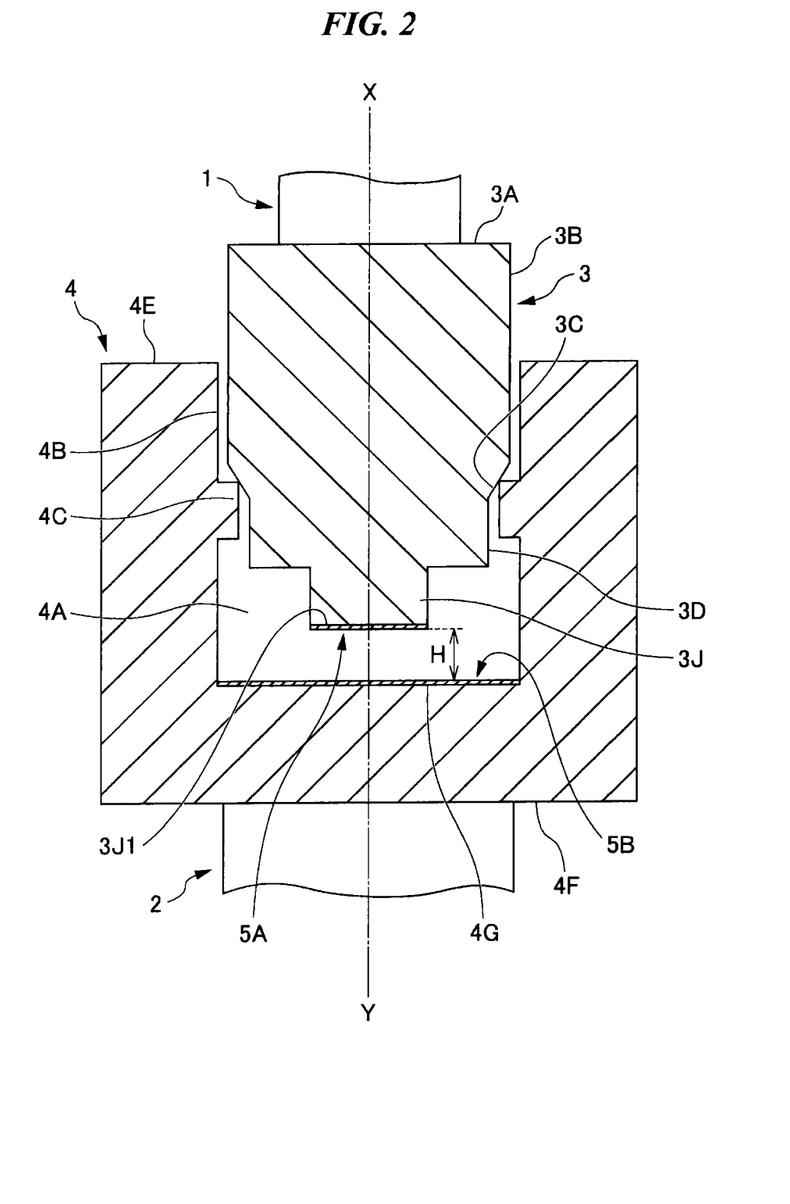
FIG. 2 is a cross-sectional view for explaining an electrical bonding method according to a second embodiment of the present invention.

Another example of a basic embodiment of an electrical bonding method according to the present invention is next described with reference to FIG. 2. The main difference of the first bonding target member 3 from that of the first embodiment lies in that it has a relative displacement amount setting portion 3J at its end part and a current conduction suppressing layer 5A is formed on an end face 3J1 thereof. The main difference of the second bonding target member 4 from that of the first embodiment lies in that it has a hole portion 4A which is a recess having a bottom shown as a bottom face 4G, and a current conduction suppressing layer 5B is formed on the bottom face 4G in the recess. Then, as described above, with the first bonding target member 3 positioned and placed on the second bonding target member 4, the position of the relative displacement amount setting portion 3J relative to the bottom face 4G, the position of the end face 3J1 of the relative displacement amount setting portion 3J, and the thicknesses of the current conduction suppressing layer 5A and the current conduction suppressing layer 5B are determined such that the distance H between the current conduction suppressing layer 5A on the end face 3J1 of the relative displacement amount setting portion 3J and the current conduction suppressing layer 5B on the bottom face 4G is equal to the desired bonding width H of the bonded portion.

However, only either one of the current conduction suppressing layer 5A and the current conduction suppressing layer 5B may be formed. The bottom face 4G in the recess plays the role of the setting face 3F of the first bonding target member 3 of the first embodiment. However, the position of the relative displacement amount setting portion 3J and the thicknesses of the current conduction suppressing layer 5A and the current conduction suppressing layer 5B are selected to determine the desired bonding width H of the bonded portion in view of the position of the bottom face 4G because the bottom face 4G in the recess is preliminarily determined in this second embodiment. Here, because the bottom face 4G of the recess serves a similar function to the setting face 3F described in the first embodiment, it may be referred to as "setting face." While the size and shape of the relative displacement amount setting portion 3J in the direction perpendicular to the central axis X-Y are not limited as long as the relative displacement amount setting portion 3J has a diameter that is equal to or smaller than the diameter of the face 3D of the first bonding target member 3, the relative displacement amount setting portion 3J advantageously has a circular shape with nearly the same diameter as the face 3D for improvement of mechanical strength against vibration and so on. In addition, the degree of parallelization between the current conduction suppressing layer 5A and the current conduction suppressing layer 5B is preferably high so that their entire faces can closely contact each other.

The bonding method is not described in detail because it is almost the same as that of the first embodiment. The current conduction suppressing layer 5A and the current conduction suppressing layer 5B approach each other as the bonding width of the bonded portion increases in the bonding process, and a bonded portion with a predetermined bonding width H as described in the first embodiment is formed and the bonding step is completed when the current conduction suppressing layer 5A and the current conduction suppressing layer 5B contact each other. After that, a post-heating current is applied to the first bonding target member 3 and the second bonding target member 4 through the first bonding electrode 1 and the second bonding electrode 2 as described above. Because the current conduction suppressing layer 5A and the current conduction suppressing layer 5B prevent a portion of the post-heating current from flowing between the relative displacement amount setting portion 3J of the first bonding target member 3 and the bottom shown as the bottom face 4G of the second bonding target member 4, substantially all the post-heating current flows through the bonded portion between the first bonding target member 3 and the second bonding target member 4, resulting in stable tempering.

In a bonded article obtained by the electrical bonding method of this second embodiment, the bonded portion between the first bonding target member 3 and the second bonding target member 4, and the bottom portion with the relative displacement amount setting portion 3J of the first bonding target member 3 and the bottom face 4G of the second bonding target member 4 receive vibrations or impact forces from the outside. Thus, the bonded article has high mechanical strength compared to the case where vibrations or impact forces from the outside are received only by the bonded portion between the first bonding target member 3 and the second bonding target member 4. In addition, for the reasons described above, almost all post-heating current flows through the bonded portion between the first bonding target member 3 and the second bonding target member 4. Thus, stable tempering can be achieved without the need to use a particularly higher post-heating current than in a conventional method.

Third Embodiment

Figure 3:
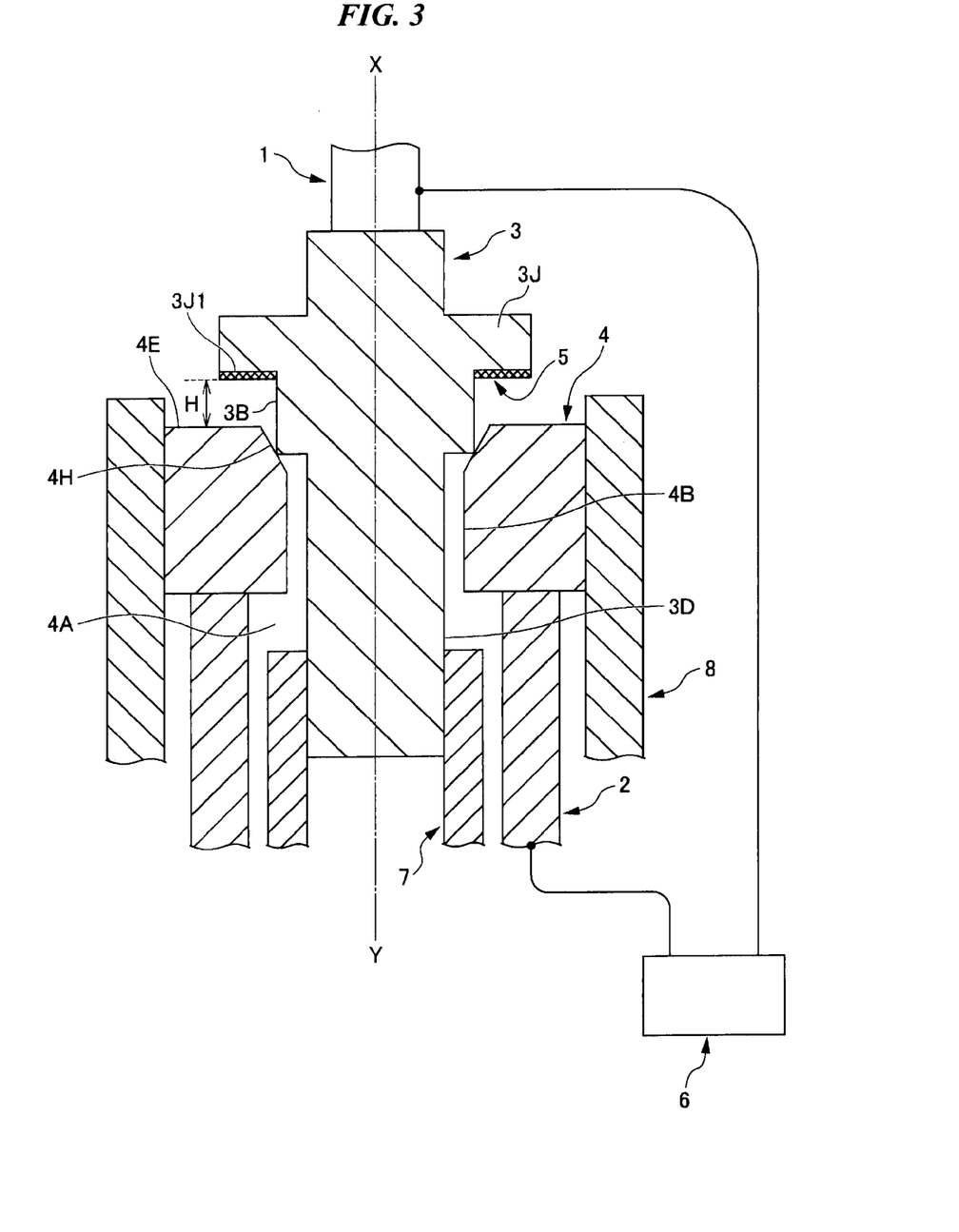
FIG. 3 is a cross-sectional view for explaining an electrical bonding apparatus for implementing an electrical bonding method according to a third embodiment of the present invention.

One example of an electrical bonding apparatus according to a third embodiment of the present invention is described with reference to FIG. 3. FIG. 3 shows a state before electrical bonding in which the first bonding target member 3 has been positioned and placed on the second bonding target member 4 with the first bonding electrode 1 in a light contact with an upper face of the first bonding target member 3 and a cylindrical large-thickness second bonding electrode 2 supporting a large-thickness short cylindrical second bonding target member 4. The first bonding electrode 1 and the second bonding electrode 2 are connected to an electrical bonding power source 6. The first bonding target member 3 is positioned on the second bonding target member 4 by a positioning member 7, and, similarly, the second bonding target member 4 is positioned on the second bonding electrode 2 by a positioning member 8. The detailed explanation of the elements described with reference to FIG. 1A, FIG. 1B and FIG. 2 is omitted.

The first positioning member 7 is a member for determining the position of the first bonding target member 3 in a direction perpendicular to the X-Y axis. The second positioning member 8 determines the position of the second bonding target member 4 in a direction perpendicular to the X-Y axis, and its position in a direction perpendicular to the X-Y axis relative to the first positioning member 7 is determined. Thus, the relative positions of the first bonding target member 3 and the second bonding target member 4 in a direction perpendicular to the X-Y axis are determined by the first positioning member 7 and the second positioning member 8. Thus, even when the first bonding target member 3 and the second bonding target member 4 are moved relative to each other, their relative positions in a direction perpendicular to the X-Y axis do not change. The first positioning member 7 and the second positioning member 8 may be also applied to the first and second embodiments.

Either one of the first positioning member 7 and the second positioning member 8 may be fixed to the electrical bonding apparatus, and the position of the other can be relatively determined with respect to the position of the fixed one.

The first bonding target member 3 includes a relative displacement amount setting portion 3J, which has the shape of a large-thickness plate and functions as described above, at a position that is located outside the hole portion 4A of the second bonding target member 4. The relative displacement amount setting portion 3J has such a thickness that it is not deformed or broken under the pressing force during bonding and tempering. In addition, the relative displacement amount setting portion 3J is preferably formed integrally with the rest of the first bonding target member 3 from the standpoint of mechanical strength. A current conduction suppressing layer 5, which is similar to that described in the first embodiment, is formed on a face 3J1 of the relative displacement amount setting portion 3J that is placed opposite to or facing a face 4E of the second bonding target member 4. Here, because the face 4E of the second bonding target member 4 serves a similar function to the setting face 3F described in the first embodiment, it may be referred to as "setting face."

The positioning members 7 and 8 have almost the same structure, and are constituted of two or more identical members that can be moved inward and outward in a direction perpendicular to the central axis X-Y, for example. First, the positioning member 8 has been expanded radially outward when the second bonding target member 4 is placed on an upper face of the second bonding electrode 2. In this state, the second bonding target member 4 is placed on an upper face of the second bonding electrode 2. Then, the positioning member 8 is contracted radially inward to position the second bonding target member 4 in a predetermined position on the second bonding electrode 2. Next, when the first bonding target member 3 is placed on the second bonding target member 4 when the positioning member 7 has been expanded radially outward, and then the positioning member 7 performs a contracting operation to position the first bonding target member 3 such that a corner portion of a bonding target portion shown as the face 3B of the first bonding target member 3 is located evenly on an inclined face 4H of the second bonding target member 4.

In a state where the first bonding target member 3 and the second bonding target member 4 have been positioned as described above and the first bonding electrode 1 and the second bonding electrode 2 has not applied a pressing force to the first bonding target member 3 and the second bonding target member 4, the distance between the setting face 4E of the second bonding target member 4 and the current conduction suppressing layer 5 is equal to a predetermined distance H. In other words, the position of the relative displacement amount setting portion 3J, the position of the setting face 4E of the second bonding target member 4, the thickness of the current conduction suppressing layer 5, the width in the direction of the central axis X-Y of the bonding target portion shown as the face 3B of the first bonding target member 3, the size of the overlap allowance between the bonding target portion shown as the face 3B of the first bonding target member 3 and a bonding target portion shown as the face 4B of the second bonding target member 4, and the inclination and depth of the inclined face 4H of the second bonding target member 4 are determined such that the distance between the setting face 4E of the second bonding target member 4 and the current conduction suppressing layer 5 is equal to a predetermined value H when the first bonding target member 3 is positioned in a predetermined position on the second bonding target member 4.

Either one or both of the first bonding electrode 1 and the second bonding electrode 2 can be moved relatively in a direction toward or away from each other along the central axis X-Y of the first bonding target member 3 by a pressure-drive mechanism 12 shown in FIG. 4. During bonding, the pressure-drive mechanism 12 is actuated and drives either one or both of the first bonding electrode 1 and the second bonding electrode 2 in such a direction that the distance between the first bonding electrode 1 and the second bonding electrode 2 decreases to increase the pressing force on the first bonding target member 3 and the second bonding target member 4. During the process of increasing the pressing force, the electrical bonding power source 6 supplies a bonding current to the first bonding target member 3 and the second bonding target member 4 via the first bonding electrode 1 and the second bonding electrode 2. As described above, the bonding current induces solid phase bonding between the first bonding target member 3 and the second bonding target member 4, and the first bonding electrode 1 and the second bonding electrode 2 stop moving and the bonding step is ended when the current conduction suppressing layer 5 formed on the relative displacement amount setting portion 3J contacts the face 4E of the second bonding target member 4. At this time, the pressure-drive mechanism stops operation and maintains the pressing force between the first bonding target member 3 and the second bonding target member 4 at an almost constant level for the subsequent tempering. In this embodiment, the pressure-drive mechanism 12 relatively displaces the first bonding target member 3 and the second bonding target member 4 via the first bonding electrode 1 and/or the second bonding electrode 2, in other words, serves as a bonding target member displacing device.

The positioning member 7 or 8 may be configured to displace in the direction of the central axis X-Y after contracting radially inward to clamp a bonding target member to displace the bonding target member. Here, the "displacement" is the displacement necessary to bringing the first bonding target member 3 and the second bonding target member 4 into contact with each other before the application of pressure. In this case, the positioning member 7 and/or 8 may be regarded as functioning as a bonding target member displacing device because the positioning member 7 and/or 8 displace a bonding target member. When the first bonding target member 3 and the second bonding target member 4 contacts each other, the pressure-drive mechanism 12 applies a pressing force between the first bonding target member 3 and the second bonding target member 4. While the pressing force is being applied, a current is applied between the first bonding target member 3 and the second bonding target member 4. In this state, the first bonding target member 3 and the second bonding target member 4 are relatively displaced. Here, the pressure-drive mechanism 12 functions as a bonding target member displacing device. The pressure-drive mechanism 12 may be constituted integrally with the first bonding electrode 1 and/or the second bonding electrode 2.

After the cooling time necessary for the bonded portion formed between the first bonding target member 3 and the second bonding target member 4 to solidify has passed, the electrical bonding power source 6 supplies a post-heating current to the first bonding target member 3 and the second bonding target member 4 via the first bonding electrode 1 and the second bonding electrode 2. At this time, the post-heating current is substantially prevented from flowing between the relative displacement amount setting portion 3J of the first bonding target member 3 and the face 4E of the second bonding target member 4 by the current conduction suppressing layer 5 and flows through the bonded portion formed between the first bonding target member 3 and the second bonding target member 4. Thus, a bonded part including and in the vicinity of the bonded portion between the first bonding target member 3 and the second bonding target member 4 is stably tempered. After that, the electrical bonding is completed when the pressure-drive mechanism 12 moves either one or both of the first bonding electrode 1 and the second bonding electrode 2 in a direction away from each other.

While the electrical bonding power source 6 shown in FIG. 3 may be the one shown in FIG. 1 of the above-mentioned Patent Document 1, the one shown in FIG. 3 and FIG. 4 of the above-mentioned Patent Document 2, or any known power source, the waveform of the bonding current and post-heating current can be adjusted and the electrical bonding can be therefore carried out more effectively when the power source shown in FIG. 1 of the above-mentioned Patent Document 1 is used.

While in FIG. 3 the first bonding electrode 1 has such a structure as to contact an upper face of the first bonding target member 3, the first bonding electrode 1 may have such a shape as to directly contact an upper face of the relative displacement amount setting portion 3J of the first bonding target member 3 so that the pressing force can be directly applied to the upper face of the relative displacement amount setting portion 3J. The shapes of the first bonding target member 3 and the second bonding target member 4 are not limited to those of the above-mentioned first to third embodiments as long as either one of them includes a relative displacement amount setting portion, a setting face and a current conduction suppressing layer 5 that fulfill the above-mentioned conditions.

Because the bonding target members to be bonded by electrical bonding are solid-phase bonded while both of them are in a plastic flow state in the embodiments of the present invention, the metal materials that have undergone plastic flow are slightly pushed out as described above. However, because the inclined face 3E or the like is formed on the first bonding target member 3 as shown in FIG. 1A, FIG. 1B to form a space between the first bonding target member 3 and the second bonding target member 4 in the vicinity of the bonded portion, the metals that have undergone plastic flow are received in the space. This helps to achieve a good electrical bonding result.

While ferrous materials and materials of the same type as ferrous materials are shown as examples of the bonding target members in the embodiments described above, the present invention is not limited to specific metal materials. However, the first bonding target member 3 and the second bonding target member 4 are preferably made of metal materials having the same plastic flow temperature or having relatively close plastic flow temperatures from the standpoint of being able to carry out good ring mash bonding. Further, because the first bonding target member 3 is located at the center during bonding and can therefore emit less heat than the second bonding target member 4, good bonding strength can be achieved when the first bonding target member 3 is made of a metal material having the same plastic flow temperature as the second bonding target member 4 or a metal material having a slightly higher plastic flow temperature than the second bonding target member.

The inclined face 3C of the first bonding target member 3 in an embodiment of the present invention may be either a linear inclined face or a curved inclined face (C-face). It is not necessarily an inclined face. Because even when the surfaces of the overlap allowance between the part shown as the face 3B of the first bonding target member 3 and the part shown as the part 4C of the second bonding target member 4 are both flat, no problem occurs when the first bonding target member 3 is placed on the second bonding target member 4 during bonding, since the area of the overlapping surfaces is small. The inclined face 4H of the second bonding target member is the same as the inclined face 3C in this regard.

Similar to the corner portion of the inclined face 3C of the first bonding target member 3 described in the first embodiment, the corner portion of the part 4C of the second bonding target member 4 in the second embodiment may be either an inclined face or curved face (C-face). Needless to say, the corner portion of the bonding target portion shown as the face 3B of the first bonding target member 3 in FIG. 3 may also be an inclined face or curved face (C-face) as described above.

While the second bonding target member 4 is placed on the second bonding electrode 2 in each embodiment described above, the second bonding target member 4 may be placed on a mounting table (not shown). In this case, after the first bonding target member 3 is set on the second bonding target member 4 as described above, the second bonding electrode 2, which moves upward from the lower side of each drawing, receives the second bonding target member 4 and the first bonding target member 3 from the mounting table (not shown) and moves upward to sandwich the first bonding target member 3 and the second bonding target member 4 between the first bonding electrode 1 and the second bonding electrode 2 to apply a pressure to the first bonding target member 3 and the second bonding target member 4.

A method for manufacturing a bonded article as the embodiment of the present invention is described with reference to the flowchart of FIG. 5. Here, description is made of the case of the embodiment shown in FIG. 1A, FIG. 1B. As for the positioning members, however, refer to FIG. 3.

First, the electrical bonding apparatus is activated (S1), and the first bonding target member 3 is provided to the electrical bonding apparatus (S2). The first bonding target member 3 has the setting face 3F, which will be placed opposed to the relative displacement amount setting portion 4D of the second bonding target member, which is described next.

In parallel, the second bonding target member 4 is provided to the electrical bonding apparatus (S3). The second bonding target member 4 has the hole portion 4A for receiving a part of the first bonding target member 3, and the relative displacement amount setting portion 4D. In this embodiment, the current conduction suppressing layer 5 is formed on the relative displacement amount setting portion 4D (FIG. 1A, FIG. 1B and FIG. 2). The current conduction suppressing layer may be formed on the first bonding target member 3 or on both the first bonding target member 3 and the second bonding target member 4 (5A, 5B (FIG. 2), 5 (FIG. 3).

The provided first and second bonding target members 3 and 4 are positioned (S4). In the embodiment shown in FIG. 3, the second bonding target member 4 is placed on an upper face of the second bonding electrode 2 with the positioning member 8 having been expanded radially outward. Then, the positioning member 8 is contracted radially inward to position the second bonding target member 4 in a predetermined position on the second bonding electrode 2.

The first bonding target member 3 is placed on the second bonding target member 4 with the positioning member 7 having been expanded radially outward. Then, the positioning member 7 performs a contracting operation to position the first bonding target member 3 such that a corner portion of a bonding target portion shown as the face 3B of the first bonding target member 3 is located evenly on the inclined face 4H of the second bonding target member 4.

In a method of variation, the positioning member 7 may perform a contracting operation before the first bonding target member 3 is placed on the second bonding target member 4. In this case, the positioning member 7 may be displaced downward in the drawing after clamping the first bonding target member 3 to bring the first bonding target member 3 into contact with the second bonding target member 4. Also in this case, the first bonding target member 3 is positioned such that the corner portion of the bonding target portion of the first bonding target member 3 is located on the inclined face 4H of the second bonding target member 4.

With the first bonding target member 3 in contact with the second bonding target member 4, a pressure is applied to both the bonding target members (S5). A bonding current is applied to the first and second bonding target members with the pressure being applied thereto (S6). Then, the bonding current flows through the contact spot and increases the temperature of the vicinity of the contact point, and the part undergoes plastic flow.

Meanwhile, the first and second bonding target members are relatively displaced until the relative displacement amount setting portion 4D and the setting face 3F contacts each other via the current conduction suppressing layer 5 (S7). The displacement is accomplished by the pressure-drive mechanism 12 (FIG. 4). When the current conduction suppressing layer 5 contacts the second bonding target member 4, the first bonding electrode 1 and the second bonding electrode 2 stop moving. At this time, the power supply is once interrupted. In this way, solid phase bonding is achieved between the bonding target members.

After the completion of the solid phase bonding, a post-heating current is applied to the first and second bonding target members (S8). The bonded part is tempered by the flow of the post-heating current. At this time, the current conduction suppressing layer suppresses the amount of current that flows through the relative displacement amount setting portion 4D and the setting face 3F.

In this way, the production of a bonded article with stable bonding strength is completed with a smaller amount of current (S9).

In the above method, the displacement amount H of the bonded portion formed between the first bonding target member 3 and the second bonding target member 4 in the relative displacement direction of the first and second bonding target members 3 and 4 may be determined by the position of the relative displacement amount setting portion of the first bonding target member 3 or the second bonding target member 4 and the position of the setting face of the second bonding target member 4 or the first bonding target member 3 before the start of bonding and the thickness of the current conduction suppressing layer 5. The distance H is equal to the displacement amount by which the first bonding target member 3 and the second bonding target member 4 are relatively displaced during bonding.

The electrical bonding method according to a first implement of the present invention is an electrical bonding method in which a pressing force and a bonding current are applied between a second bonding target member having a hole portion for receiving a part of a first bonding target member and the first bonding target member to electrically bond the first and second bonding target members, and then a post-heating current is applied to the bonded first and second bonding target members for tempering, characterized in that the first or second bonding target member has a relative displacement amount setting portion for setting the distance by which a bonding target portion of the first bonding target member and a bonding target portion of the second bonding target member are relatively displaced during bonding; the second or first bonding target member has a setting face that is placed opposed to the relative displacement amount setting portion; either one or both of the relative displacement amount setting portion of the first or second bonding target member and the setting face of the second or first bonding target member has a current conduction suppressing layer formed thereon so that the relative displacement amount setting portion can contact the setting face of the first or second bonding target member via the current conduction suppressing layer during bonding; the first and second bonding target members are relatively displaced until the relative displacement amount setting portion and the setting face contact each other via the electrically insulating layer during bonding when a bonding current is applied to the first and second bonding target members with a pressing force being applied thereto by first and second bonding electrodes to form a bonded portion; and the post-heating current is subsequently applied to the first and second bonding target members whereby the post-heating current flows substantially only through the bonded portion formed between the first and second bonding target members to temper a bonded part including and in the vicinity of the bonded portion.

The electrical bonding apparatus according to a second implement of the present invention is an electrical bonding apparatus including a first bonding electrode and a second bonding electrode for applying a pressing force and a bonding current between a second bonding target member having a hole portion for receiving a part of a first bonding target member and the first bonding target member to electrically bond the first and second bonding target members, and applying a post-heating current to the electrically bonded first and second bonding target members for tempering, characterized in that the first or second bonding target member has a relative displacement amount setting portion for setting the distance by which a bonding target portion of the first bonding target member and a bonding target portion of the second bonding target member are relatively displaced during bonding; the second or first bonding target member has a setting face that is placed opposed to the relative displacement amount setting portion of the first or second bonding target member; either one or both of the relative displacement amount setting portion of the first or second bonding target member and the setting face of the second or first bonding target member has a current conduction suppressing layer provided thereon so that the relative displacement amount setting portion can contact the setting face of the first or second bonding target member via the current conduction suppressing layer during bonding; the first bonding electrode and the second bonding electrode relatively displace the first and second bonding target members until the relative displacement amount setting portion and the setting face contact each other via the current conduction suppressing layer when a bonding current is applied to the first and second bonding target members with a pressing force being applied to the first and second bonding target members to form a bonded portion; and the post-heating current is subsequently applied to the first and second bonding target members whereby the post-heating current flows substantially only through a bonded portion formed between the first and second bonding target members to temper a bonded part including and in the vicinity of the bonded portion.

The electrical bonding method or electrical bonding apparatus according to a third implement of the present invention is characterized, in the first or second implement, in that the width of the bonded portion formed between the first and second bonding target members in the direction in which the first and second bonding target members are relatively displaced is determined by the position of the relative displacement amount setting portion of the first or second bonding target member and the position of the setting face of the second or first bonding target member before the start of bonding and the thickness of the current conduction suppressing layer.

INDUSTRIAL APPLICABILITY

The present invention can be applied to obtain various bonded articles, and, in particular, to electrical bonding of a bonding target member used as a component part of an automobile e.g. which is exposed to significant vibrations or impact forces.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: first bonding electrode
2: second bonding electrode
3: first bonding target member
 3A, 3D, 3G, 3G, 3H: face of first bonding target member 3
 3B: face showing part that serves as at least portion of bonding target portion
 3C: inclined face
 3E: inclined face
 3F: setting face (face)
 3J: relative displacement amount setting portion (FIG. 2, FIG. 3)
4: second bonding target member
 4A: hole portion
 4B: face forming hole portion 4A
 4C: face showing part that serves as at least a portion of bonding target portion
 4D: relative displacement amount setting portion (FIG. 1A, FIG. 1B)
 4E: face (FIG. 1A, FIG. 1B, FIG. 2) or setting face (FIG. 3)
 4G: bottom face or setting face
 4H: inclined face of second bonding target member
5: current conduction suppressing layer
 5A, 5B: current conduction suppressing layer
6: electrical bonding power source
7: positioning member for first bonding target member 3
8: positioning member for second bonding target member 4

The invention claimed is:

1. A method for manufacturing a bonded article, comprising the steps of:
 providing a first bonding target member;
 providing a second bonding target member to be bonded to the first bonding target member, the second bonding target member having a hole portion for receiving a part of the first bonding target member,
 the first or second bonding target member having a relative displacement amount setting portion for setting the distance by which a bonding target portion of the first bonding target member and a bonding target portion of the second bonding target member are relatively displaced during bonding,
 the second or first bonding target member having a setting face that is placed opposed to the relative displacement amount setting portion,
 either one or both of the relative displacement amount setting portion of the first or second bonding target member and the setting face of the second or first bonding target member having a current conduction suppressing layer formed thereon for suppressing conduction of current so that the relative displacement amount setting portion can contact the setting face of the first or second bonding target member via the current conduction suppressing layer during bonding;
 applying a pressing force to the first and second bonding target members;
 relatively displacing the first and second bonding target members until the relative displacement amount setting portion and the setting face contact each other via the current conduction suppressing layer during bonding when a bonding current to the first and second bonding target members with the pressing force being applied thereto to form a bonded portion; and
 applying a post-heating current, after the displacing step, to the first and second bonding target members whereby the post-heating current flows substantially only through a bonded portion formed between the first and second bonding target members to temper a bonded part of the bonded portion.

2. The method for manufacturing a bonded article according to claim 1, wherein the width of the bonded portion formed between the first and second bonding target members in the direction in which the first and second bonding target members are relatively displaced is determined by the position of the relative displacement amount setting portion the first or second bonding target member and the position of the setting face of the second or first bonding target member before the start of bonding and the thickness of the current conduction suppressing layer.

* * * * *